United States Patent [19]
Brewer

[11] Patent Number: 5,937,529
[45] Date of Patent: Aug. 17, 1999

[54] APPARATUS FOR MEASURING VERTICAL DISPLACEMENT

[75] Inventor: Aubrey W. Brewer, Knoxville, Tenn.

[73] Assignee: Level-Tech International, LLC, Knoxville, Tenn.

[21] Appl. No.: 08/843,305

[22] Filed: Apr. 14, 1997

[51] Int. Cl.[6] .................................................. G01C 5/04
[52] U.S. Cl. ............................................................ 33/367
[58] Field of Search ........................... 33/365, 367, 374, 33/375, 377, 378

[56] References Cited

U.S. PATENT DOCUMENTS

| | | | |
|---|---|---|---|
| 277,037 | 5/1883 | Le Grande | 33/367 |
| 652,078 | 6/1900 | Cable | 33/377 |
| 946,660 | 1/1910 | Deslattes | 33/367 |
| 2,113,893 | 4/1938 | Loosli | 33/367 |
| 2,814,127 | 11/1957 | Blatchford | 33/367 |
| 4,087,920 | 5/1978 | Haggert et al. | 33/367 |
| 4,610,094 | 9/1986 | Robson et al. | 33/367 |
| 4,686,773 | 8/1987 | Brewer | 33/367 |
| 4,769,918 | 9/1988 | Price et al. | 33/367 |
| 4,972,596 | 11/1990 | Brewer | 33/370 |
| 4,991,302 | 2/1991 | Brewer | 33/367 |
| 5,309,645 | 5/1994 | Hoffmeyer | 33/367 |

FOREIGN PATENT DOCUMENTS

| | | | |
|---|---|---|---|
| 632251 | 1/1995 | European Pat. Off. | 33/377 |
| 1688111 | 10/1991 | U.S.S.R. | 33/377 |

*Primary Examiner*—G. Bradley Bennett
*Attorney, Agent, or Firm*—Harness, Dickey & Pierce, P.L.C.

[57] ABSTRACT

An apparatus for measuring the vertical displacement of a plurality of horizontally spaced locations on a variety of surfaces is disclosed. A fluid reservoir having a plurality of outlets is freely suspended on a support means, such as a tripod. A plurality of measuring means, at horizontally spaced locations, are connected to the plurality of fluid reservoir outlets. Each measuring means is then separately calibrated to a desired vertical height at its particular horizontal location to establish a reference point. Once the measuring means is calibrated, a single operator can determine to what degree a plurality of horizontally spaced locations are either higher or lower than the reference point. Additionally, a leveling apparatus is disclosed which also allows a single operator to determine the vertical displacements of a plurality of horizontally spaced locations.

22 Claims, 3 Drawing Sheets

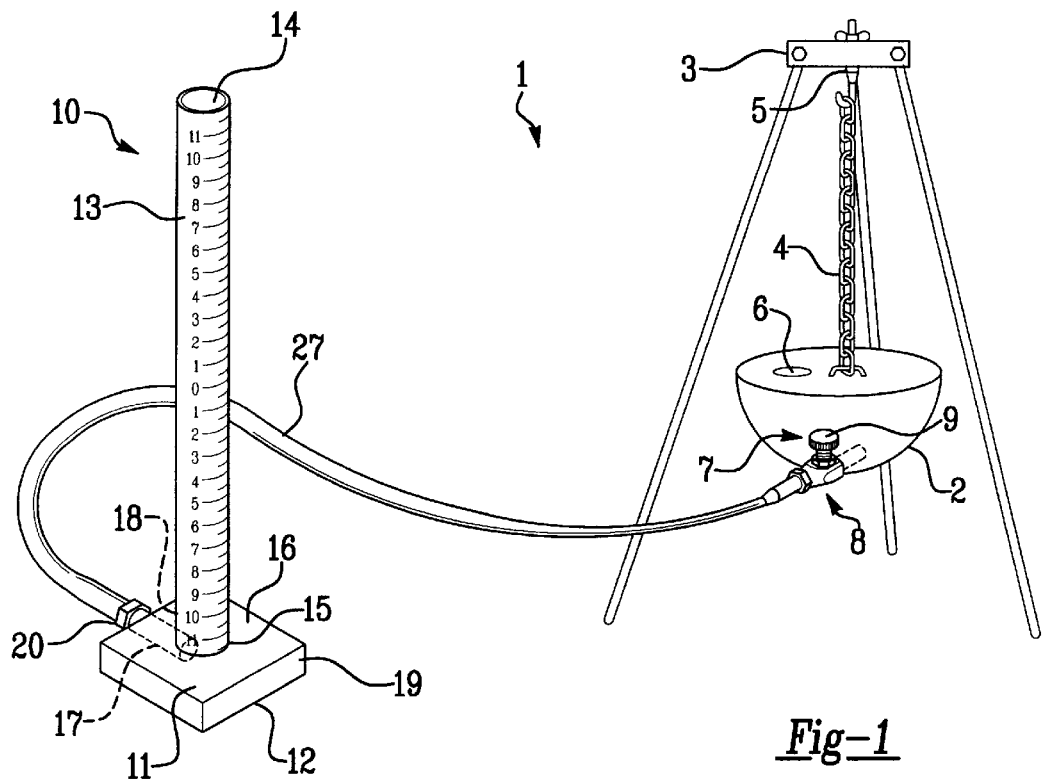
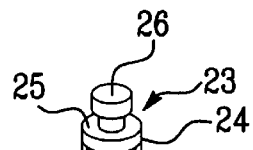
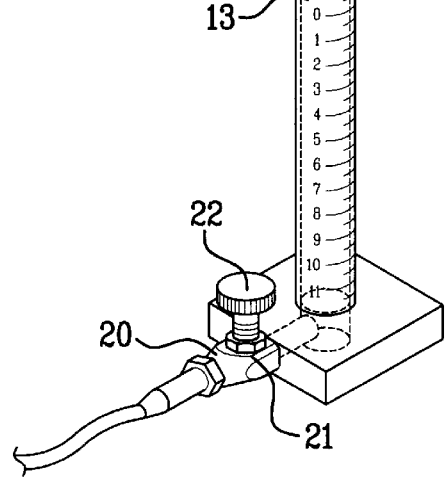
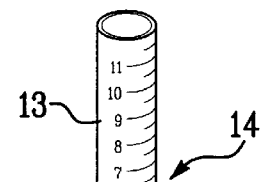
Fig-1
Fig-2
Fig-3

APPARATUS FOR MEASURING VERTICAL DISPLACEMENT

FIELD OF THE INVENTION

The present invention relates generally to measuring devices, and more particularly to an apparatus which measures the vertical displacement between a plurality of horizontally spaced locations on a variety of surfaces.

BACKGROUND OF THE INVENTION

In construction, and other applications, it is often important to know the vertical displacement between two or more selected and spaced locations. Typically, such vertical displacements are determined by the use of a tripod, surveyor's level, and rod which are used in a conventional manner to detect vertical displacements between a reference point and a selected and spaced location. Measurements of this type are labor intensive operations and require a considerable amount of training. Furthermore, it is not uncommon for inaccurate measurements to be taken, especially if the operator is insufficiently or improperly trained. These inaccurate measurements can cause serious structural defects in the resulting structures.

As a potential solution to this problem, numerous liquid leveling systems have been developed in the past. While these leveling systems, as a general rule, incorporate one or more liquid containing members, the systems generally are designed to provide a representation of whether two points are level, one with respect to the other. Additionally, these leveling systems generally require that the surface upon which the reference point is placed is perfectly level in order to properly calibrate the leveling system. A perfectly level surface is generally not available on construction sites and other remote and rugged locations. Finally, these leveling systems are generally able to detect the vertical displacement between only two selected and spaced locations, whereas it is preferable to be able to detect the vertical displacement between a plurality of selected and spaced locations. Various examples of leveling and measuring systems are found in U.S. Pat. Nos. 4,087,920 to Huggert et al.; 4,686,773 to Brewer; 4,972,596 to Brewer; and 4,991,302 to Brewer, the entire disclosures of which are hereby incorporated by reference.

Therefore, what is needed is an apparatus for measuring the vertical displacement between a plurality of selected and spaced locations on a variety of surfaces.

OBJECTS OF THE INVENTION

Accordingly, it is an object of the present invention to provide a new and improved measuring apparatus.

It is another object of the present invention to provide a new and improved measuring apparatus, wherein the measurements may be readily and accurately determinable by a single operator.

It is another object of the present invention to provide a new and improved measuring apparatus, wherein the apparatus may be readily manufactured and easily maintained, and which is readily portable.

It is another object of the present invention to provide a new and improved apparatus for measuring vertical displacement.

It is another object of the present invention to provide a new and improved apparatus for measuring the vertical displacement between a plurality of selected and spaced locations.

It is another object of the present invention to provide a new and improved apparatus for measuring the vertical displacement between a plurality of selected and spaced locations, wherein the measurements may be readily and accurately determinable by a single operator.

It is another object of the present invention to provide a new and improved apparatus for measuring the vertical displacement between a plurality of selected and spaced locations, wherein the apparatus may be readily manufactured and easily maintained, and which is readily portable.

It is another object of the present invention to provide a new and improved apparatus for measuring the vertical displacement between a plurality of selected and spaced locations on a variety of surfaces.

It is another object of the present invention to provide a new and improved apparatus for measuring the vertical displacement between a plurality of selected and spaced locations on a variety of surfaces, wherein the measurements may be readily and accurately determinable by a single operator.

It is another object of the present invention to provide a new and improved apparatus for measuring the vertical displacement between a plurality of selected and spaced locations on a variety of surfaces, wherein the apparatus may be readily manufactured and easily maintained, and which is readily portable.

It is another object of the present invention to provide a new and improved leveling apparatus.

It is another object of the present invention to provide a new and improved leveling apparatus, wherein the measurements may be readily and accurately determinable by a single operator.

It is another object of the present invention to provide a new and improved leveling apparatus, wherein the apparatus may be readily manufactured and easily maintained, and which is readily portable.

It is another object of the present invention to provide a new and improved leveling apparatus for measuring vertical displacement.

It is another object of the present invention to provide a new and improved leveling apparatus for measuring the vertical displacement between a plurality of selected and spaced locations.

It is another object of the present invention to provide a new and improved leveling apparatus for measuring the vertical displacement between a plurality of selected and spaced locations, wherein the measurements may be readily and accurately determinable by a single operator.

It is another object of the present invention to provide a new and improved leveling apparatus for measuring the vertical displacement between a plurality of selected and spaced locations, wherein the apparatus may be readily manufactured and easily maintained, and which is readily portable.

It is another object of the present invention to provide a new and improved leveling apparatus for measuring the vertical displacement between a plurality of selected and spaced locations on a variety of surfaces.

It is another object of the present invention to provide a new and improved leveling apparatus for measuring the vertical displacement between a plurality of selected and spaced locations on a variety of surfaces, wherein the measurements may be readily and accurately determinable by a single operator.

It is another object of the present invention to provide a new and improved leveling apparatus for measuring the vertical displacement between a plurality of selected and spaced locations on a variety of surfaces, wherein the apparatus may be readily manufactured and easily maintained, and which is readily portable.

Further and other objects of the present invention will become apparent from the description contained herein.

SUMMARY OF THE INVENTION

In accordance with one aspect of the present invention, the foregoing and other objects are achieved by:
  a support means;
  a first adjustment means, the adjustment means being connected to the support means, the first adjustment means being capable of being adjusted lengthwise;
  a fluid reservoir, the fluid reservoir containing at least one fluid inlet, the fluid reservoir containing at least one fluid outlet, the fluid reservoir being connected to the first adjustment means the fluid reservoir being allowed to suspend freely from the first adjustment means; and
  a measuring instrument, the measuring instrument including a base portion having a bottom and upright tube defining a chamber for containing a fluid, the tube having a lower portion with a first access opening communicating with the fluid and an upper end portion defining an access opening to the atmosphere, the measuring instrument being in fluid communication the fluid reservoir.

In accordance with another aspect of the present invention, the foregoing and other objects are achieved by:
  a support means;
  a first adjustment means, the adjustment means being connected to the support means, the first adjustment means being capable of being adjusted lengthwise;
  a fluid reservoir, the fluid reservoir containing at least one fluid inlet, the fluid reservoir containing at least one fluid outlet, the fluid reservoir being connected to the first adjustment means, the fluid reservoir being allowed to suspend freely from the first adjustment means; and
  a measuring instrument, the measuring instrument comprising a substantially rectangular member, the member having a top surface, a bottom surface, a first end, a second end, and a body, the top surface having a centrally located area defining a recess, the recess extending from substantially the first end to substantially the second end, the recess tightly receiving a tube defining a chamber for containing a fluid, the tube having a lower portion with a first access opening communicating with the fluid and an upper end portion defining an access opening to the atmosphere, the measuring instrument being in fluid communication with the fluid reservoir.

In accordance with another aspect of the present invention, the foregoing and other objects are achieved by:
  a substantially rectangular member, the member having a top surface, a bottom surface, a first end, a second end, and a body, the body having first and second measuring instruments disposed within the body, the first and second measuring instruments being in fluid communication with each other, the first and second measuring instruments having indicia means for determining the level of liquid within the first and second measuring instruments.

BRIEF DESCRIPTION OF THE DRAWINGS

FIG. 1 illustrates a perspective view of a measuring system, in accordance with one aspect of the present invention.

FIG. 2 illustrates a perspective view of an alternative embodiment of a measuring instrument, in accordance with another aspect of the present invention.

FIG. 3 illustrates a perspective view of an alternative embodiment of a measuring instrument, in accordance with another aspect of the present invention.

DETAILED DESCRIPTION OF PREFERRED EMBODIMENT

Figure 4:
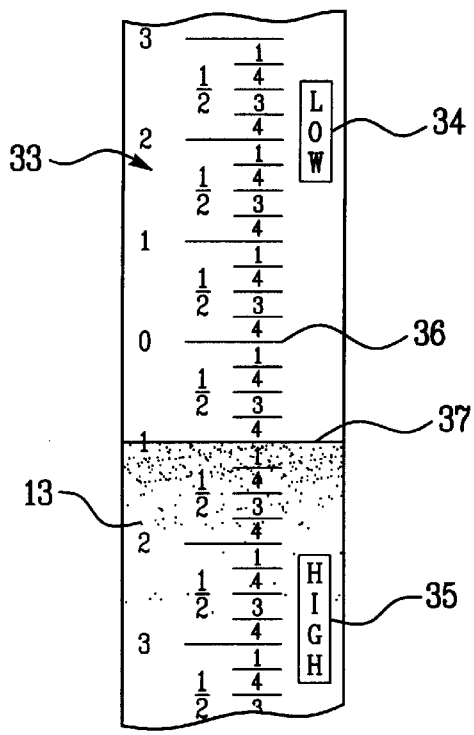
FIG. 4 provides an enlarged view depicting the technique used to measure the vertical displacement between two locations when the measuring instrument is below a predetermined benchmark height, in accordance with another aspect of the present invention.

An open circuit measuring system (the term "system" is being used synonymously with the term "apparatus") incorporating various features of the present invention is illustrated generally at 1 in the figures. Referring to FIG. 1, the measuring system 1 includes a fluid reservoir 2 which is freely suspended from a support means 3, such as a tripod or other suitable support means, for example. The critical requirement is that the fluid reservoir 2 be allowed to suspend freely, acted on only be the force of gravity, without contacting the ground or any other horizontal or vertical surfaces. Therefore, the support means 3 should be properly constructed so as to allow the fluid reservoir 2 to freely suspend without contacting the support means 3 itself or any other horizontal or vertical surfaces. Additionally, the exact fluid capacity of the fluid reservoir 2 is not critical, although it is preferable to have a sufficiently large fluid capacity, as will become apparent later on in the description. Finally, the exact shape of the fluid reservoir 2 is not critical, in that it can be shaped in the form of a bucket, bowl, bottle, or any number of other suitable shapes.

The fluid reservoir 2 is connected to a first adjustment means 4 (also referred to as a course adjustment means) such as a chain link, a wire, a rope, a string, or any other suitable adjustment means which are capable of being adjusted lengthwise. It is preferable for the first adjustment means 4 to be connected to the central axis of the fluid reservoir 2 in order to avoid flipping or tipping the fluid reservoir 2 over. In one embodiment, the first adjustment means 4 may be used to lower or raise the fluid reservoir 2 in relatively large increments such as one inch units (or its equivalent expressed in metric linear units). In the context of a chain link, the chain links can be looped or hooked together or removed to raise the fluid reservoir 2. Alternatively, the chain links can be unlooped or unhooked or added to lower the fluid reservoir 2. Additionally, the first adjustment means 4 may be connected directly to the support means 3 by any number of suitable means including, but not limited to, a wing nut in cooperation with a hook. By rotating the wing nut in the appropriate direction, the operator can lower or raise the hook, which in turn lowers or raises the first adjustment means 4, which then in turn raises or lowers the fluid reservoir 2 to the desired height. Alternatively the first adjustment means 4 may be connected to a second adjustment means 5 (also referred to a fine adjustment means) which may include, but is not limited to, a wing nut in cooperation with a hook. The second adjustment means 5 may be used to lower or raise the fluid reservoir 2 in relatively small increments such as fractions of an inch (or its equivalent expressed in metric linear units). Again, by rotating the wing nut in the appropriate direction, the operator can ultimately lower or raise the fluid reservoir 2 to the desired height. The only difference between the course adjustment means 4 and the fine adjustment means 5 is the relative amount of vertical movement of the fluid reservoir 2 achieved by each revolution of the wing nut, or other suitable means.

The fluid reservoir 2 has at least one fluid inlet 6 located proximate the upper portion of the fluid reservoir 2, and at least one fluid outlet 7 located proximate the lower portion of the fluid reservoir 2. However, it is envisioned that the fluid reservoir 2 will have a plurality of fluid outlets 7 located proximate to the lower portion of the fluid reservoir 2. The fluid inlet 6 should preferably be closed or sealed after filling the fluid reservoir 2 in order to prevent spillage. Each fluid outlet 7 is preferably provided with a selectively closable valve means in order to selectively stop any fluid flow out of the fluid reservoir 2 when it is not desirable to allow so. The valve means can include a petcock 8 and an actuator 9. The fluid reservoir 2 is in fluid communication with at least one measuring instrument 10 for measuring vertical displacement, although it is envisioned that a plurality of measuring instruments 10 can be simultaneously in fluid communication with the fluid reservoir 2.

More specifically, the measuring instrument 10 includes a base portion 11 which defines a bottom 12 which is substantially flat in the preferred embodiment. This bottom 12 engages or rests upon a suitable supporting surface at a location upon which a vertical displacement measurement is desired. The base portion 11 can be adapted to receive a clamping means or some other suitable attachment means for clamping or attaching the base portion 11 to an object.

The base portion 11 supports a reservoir which in the preferred embodiment comprises an upstanding tube 13 which is substantially cylindrical and defines a chamber 14 therein which receives a fluid such as water. The tube 13 is preferably transparent or translucent for easy viewing of the fluid level. The fluid can be colored, naturally or artificially, to enhance the visibility of the fluid. The lower portion 15 of the tube 13 is secured proximate the upper surface 16 of the base portion 11. A bore 17 extends across the base portion 11 and provides fluid communication with the recess receiving the lower portion 15 of the tube 13 and with the chamber 14 defined within the tube 13. Proximate the opening 18 of the bore 17 on the vertical wall 19 of the base portion 11, a suitable fitting or coupling 20 is provided.

Referring to FIG. 2, the coupling 20 of the tube 13 can include a first selectively closable valve means for selectively terminating the flow of fluid between the bore 17 and the tube 13. In one preferred embodiment such valve means includes a petcock 21 which is opened and closed through the rotation of the actuator 22. However, it will be understood that various selectively closable valves can be used if desired. Furthermore, the tube 13 can be provided with a second selectively closable valve means, such as, for example, the valve assembly 23, for sealing the access opening 24 of the tube 13. The valve assembly 23 may consist of a main body 25 and a venting conduit 26 which can be easily opened and closed.

Thus, it will be recognized that when the system 1 is being transported or otherwise is not in use, the petcock 21 is closed to seal the bore 17 and the venting conduit 26 of the valve assembly 23 is closed, thereby sealing the fluid within the measuring instrument 10. However, when the system 1 is to be used, the petcock 21 is opened to allow fluid to flow into the tube 13 and the venting conduit 26 is opened to vent the tube 13 to the ambient atmosphere. Moreover, it will be recognized that in order to serve the purpose of venting the tube 13, the venting conduit 26 can be small in diameter, such that even during use the valve assembly 23 serves to prohibit fluid from being inadvertently lost through the access opening 24 should the measuring instrument 10 be turned over.

Referring to FIG. 1, fluid communication is provided between the chamber 14 defined by the lower portion 15 of the tube 13 and the fluid reservoir 2. In the illustrated embodiment, this fluid communication is provided by a flexible tube means 27. It will be noted that this tube means 27 includes a first end portion which is connected to the coupling 20 operatively associated with the base portion 11 The opposite end portion of the flexible tube means 27 is mounted and connected to the closable valve means of the fluid reservoir 2.

In another embodiment, a second selectively closable valve means 28 can be mounted to the bottom of tube 13 in order to receive a second flexible tube means 29, wherein the first selectively closable valve means, or more specifically the coupling 20, is plugged or otherwise sealed off. The second valve means 28 would be located proximate to a bore 30 which allows fluid access to the chamber 14. The second valve means 28 can include a coupling 31 and an actuator 32 to selectively terminate any fluid flow through the second valve means 28 when not in use. The coupling 31 could be threaded to receive a one end of a garden hose, for example. The second valve means 28 may be necessary when the measuring system 10 is being used in rugged environments or over long distances. The problem foreseen with using the first flexible tube means 27 over long distances is the tendency for it to get stretched out and thus throw off the initial calibration. The second flexible tube means 29 should preferably be ruggedly constructed, such as reinforced garden hose, for example, which is resistant to stretching and structural deformation.

Figure 5:
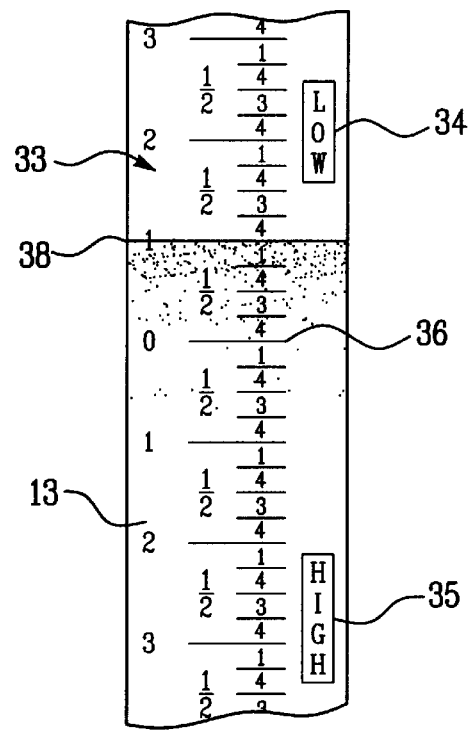
FIG. 5 provides an enlarged view depicting the technique used to measure the vertical displacement between two locations when the measuring instrument is above a predetermined benchmark height, in accordance with another aspect of the present invention.
Figure 6:
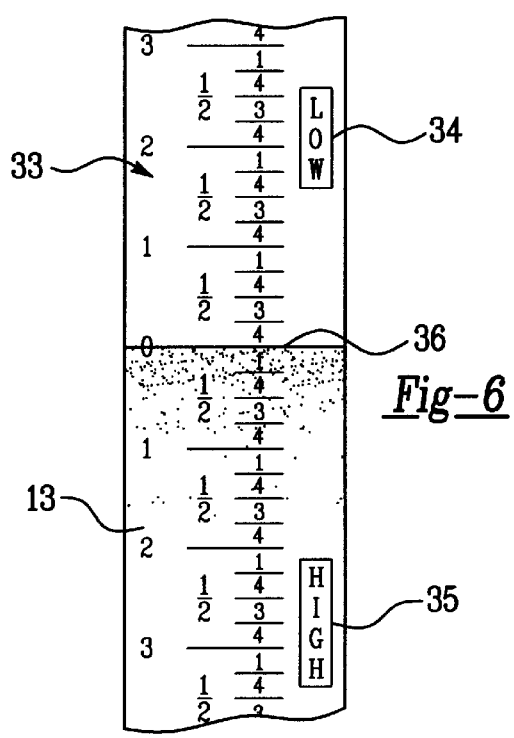
FIG. 6 provides an enlarged view depicting the technique used to measure the vertical displacement between two locations when the measuring instrument is at a predetermined benchmark height, in accordance with another aspect of the present invention.

Referring to FIG. 4, the tube 13 carries indicia means 33 for determining the level of liquid within the tube 13. The indicia means 33 can be in either English linear style (i.e., inches), metric style (i.e., centimeters), or both. Additionally, the indicia means 33 can be made on any scale desired. The indicia means 33 contain a "low" scale 34, a "high" scale 35, and a zero marking 36. Specifically, the fluid level in tube is at the one inch "low" scale mark 37. This means that the measuring instrument 10 is at a height which is one inch below a predetermined benchmark height. Referring to FIG. 5, the fluid level in tube 13 is at the one inch "high" scale mark 38. This means that the measuring instrument 10 is at a height which is one inch above a predetermined benchmark height. Referring to FIG. 6, the fluid level in tube 13 is at the zero marking 36. This means that the measuring instrument 10 is at a height which is exactly equal to a predetermined benchmark height. In this regard, an important feature of the present invention is the provision of linear measurement means carried along the length of the tube 13 at various intervals which serve to allow an operator to discern the exact distance in selected units of linear measure between the bottom of the measuring instrument 10, and a predetermined benchmark height, the significance of which is more fully discussed below. Alternatively, the indicia means 33 can be printed on a suitable material (such as a plastic strip) and disposed and secured within the interior of the tube 13.

In operation, it is first necessary to establish a benchmark or reference height to which all the other surfaces are to be raised or lowered. For example, an operator is attempting to install a floor which extends throughout all the rooms of a dwelling. The operator has determined that the floor should be at a height of 3 inches above the preexisting surface in the dwelling. This height is referred to as the benchmark or reference height. The operator then secures a block, or other suitable object, which is exactly 3 inches in height and places it anywhere on the ground in the dwelling. The operator then places the measuring system 1 of the present invention in close proximity to the block. With all the fluid reservoir outlets 7 closed, the operator places a measuring instrument 10, which is in fluid communication with the fluid reservoir 2, directly on top of the block. The measuring instrument 10 is then vented to the ambient atmosphere. The fluid reservoir outlet 7 is then opened, allowing fluid to flow from the fluid reservoir 2 into the measuring instrument 10. The operator then attempts to get the fluid level in the measuring instrument 10 to line up exactly with the zero marking 36 on the tube 13 of the measuring instrument 10. The operator accomplishes this by either raising or lowering the fluid reservoir 2 with the course and/or fine adjustment means 4, 5, respectively. For example, if the fluid level is reading "low" on the scale, the fluid reservoir 2 is lowered until the fluid level in the measuring instrument 10 reaches the zero marking 36. Conversely, if the fluid level is reading "high" on the scale, the fluid reservoir 2 is raised until the fluid level in the measuring instrument 10 reaches the zero marking 36. Once this is accomplished, the measuring system 1 has now been calibrated to the 3 inch height level. Once the measuring system 1 has been calibrated, it is critical that the support means 3 and the fluid reservoir 2 are not moved from their current location as this will necessitate a new calibration procedure. Additional measuring instruments can now be hooked up to the fluid reservoir 2, calibrated in accordance with the procedure described and placed in remote locations of the dwelling. Therefore, a single operator can determine how high or low the floor has to be raised in order to establish a universal 3 inch floor height throughout the dwelling. For example, assume that the operator has moved to a remote part of the dwelling and has placed one measuring instrument 10 upon the surface in that area. The operator determines that the fluid level in that measuring instrument 10 reads 4 inches above the zero marking 36 on the "low" scale. The operator instantaneously knows that the floor in that area of the dwelling has to be raised 4 inches in order to conform to a universal 3 inch floor height throughout the dwelling. Later, the operator moves to another remote location within the dwelling with still another measuring instrument 10. The operator determines that the fluid level in that measuring instrument 10 reads 2 inches below the zero marking 36 on the "high" scale. The operator instantaneously knows that the floor in that area of the dwelling has to be lowered 2 inches in order to conform to a universal 3 inch floor height throughout the dwelling. Finally, the operator moves to another remote location within the dwelling with yet another measuring instrument 10. The operator determines that the fluid level in that measuring instrument 10 reads exactly at the zero marking 36. The operator instantaneously knows that the floor in that area of the dwelling does not have to be either lowered or raised in order to conform to a universal 3 inch floor height throughout the dwelling. The number of different measuring instruments 10 being simultaneously used is limited only by the number of fluid outlets 7 contained on the fluid reservoir 2. It should be noted that the greater the number of measuring instruments 10 being simultaneously used, the greater the fluid capacity the fluid reservoir 2 has to be.

Figure 7:
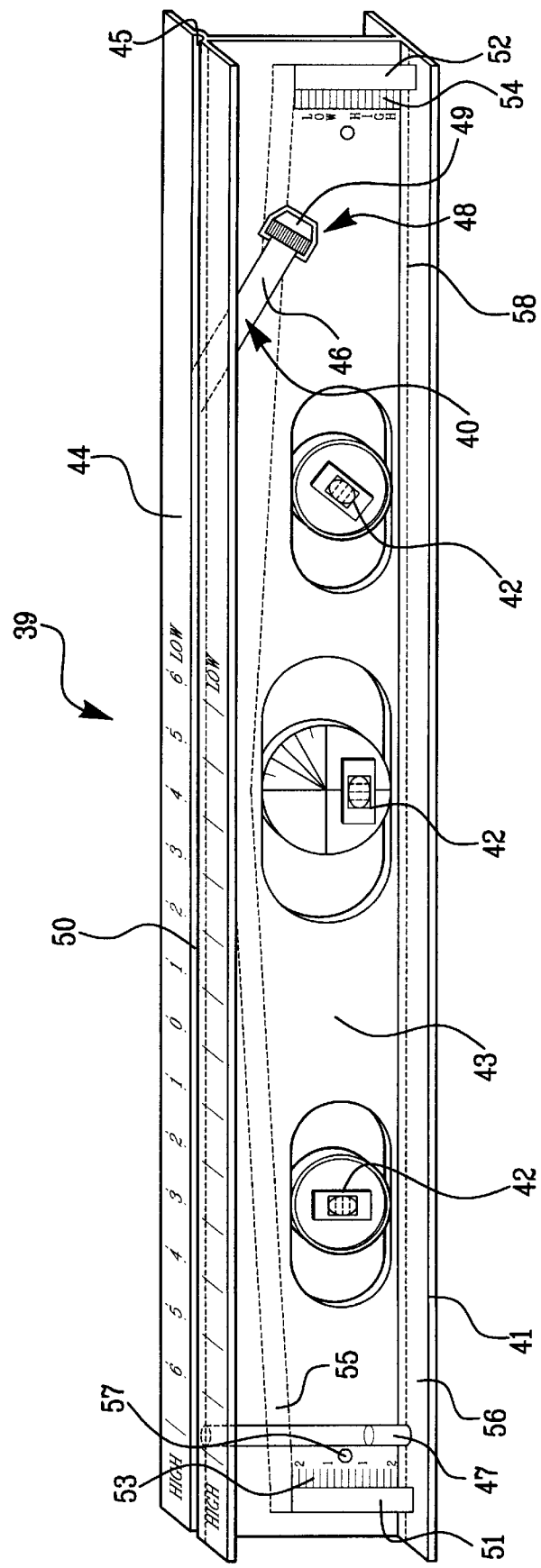
FIG. 7 illustrates a perspective view of an alternative embodiment of a measuring instrument, in accordance with another aspect of the present invention.

Referring to FIG. 7, in another embodiment, the measuring instrument 10 may be substituted or used in conjunction with an enhanced level 39 apparatus. As illustrated in FIG. 7, the level 39 is similar in basic design to a standard carpenter's level which has been adapted to receive a modified measuring instrument 40. The level 39 consists of a substantially rectangular member 41 with an optional plurality of spirit levels 42 disposed within the side portion of the body 43 at various angles to determine whether a surface is level or not. Extending along the top surface 44 of the level 39 is a centrally disposed groove or recess 45 which is intended to tightly receive a tube 46 which receives a fluid through a valve assembly 47 located at the bottom of the tube 46. The exact shape of the groove or recess 45 is not critical provided that the tube 46 fits snugly within the groove or recess 45 with an absolute minimal amount of movement. At the top of the tube 46 is a second valve assembly 48 with a venting conduit 49 for venting the tube 46 to the ambient atmosphere. Alongside the top surface 44 of the level 39 on either side of the groove or recess 45 are indicia means 50 for determining the level of liquid within the tube 46 such that, in turn, the relative level of the liquid within the tube 46 can be determined. Although the indicia means 50 are contained on the top surface 44 of the level 39, they could easily be placed on or in the tube 46 itself, although visibility of the indicia means 50 would probably be decreased. Additionally, the indicia means 50 could be placed on a magnetized surface which could then be placed upon the top surface 44 of the level 39, provided that the top surface 44 was constructed of a metallic material. This would provide the operator with an movable zero marking reference point anywhere along the length of the level 39. Additionally, there is provided an optional closed circuit vertical displacement measuring system which may be mounted on or disposed within the side portion of the body 43. This closed circuit vertical measuring system consists of a first and second measuring tubes (also referred to as measuring instruments) 51, 52 (both of which have indicia means 53, 54 located on the tubes themselves or on the body 43) which are in fluid communication with each other through a first and second hose means 55, 56. The hose means 55, 56 can be either be mounted on the outside of the body 43, disposed within the body 43 itself, or disposed within a sleeve or tube which would extend along the length of the level 39. The indicia means 53, 54 are used in a similar manner as previously described in the present application, i.e., use of "high", "low", and "zero" markings. During the manufacturing process, the level 39 would be placed on a perfectly level surface with the measuring system open and devoid of any fluid. Once the level 39 is determined to be absolutely leveled, sufficient fluid is introduced into the measuring system until the fluid level reaches the zero markings 57, 58 on the first and second measuring tubes 51, 52, respectively. When this occurs, the measuring system is correctly calibrated. The measuring system is then sealed, thus creating a closed circuit. In operation, when the level 39

(with the closed circuit vertical displacement measuring system) is placed on a surface, the operator can instantaneously determine the exact linear amount that a particular surface is out of level.

This enhanced level 39 could be used in the same exact manner as the measuring instrument 10 in order to determine vertical displacement. However, the enhanced level 39 could also be used to level surfaces and provide a straight edge for marking purposes. Therefore, the enhanced level 39 is actually three tools in one: a standard level for determining whether a surface is level, an enhanced level for determining exactly how much a particular surface is out of level, and a measuring instrument for determining vertical displacement.

The systems, apparatuses, and methods described herein could be used in many applications such as leveling and setting up structures, digging footings, laying out foundations, placing of septic systems, grading, paving, setting drain lines, landscaping, leveling machinery and equipment, setting grade stakes, as well as many other uses.

While there has been shown and described what are at present considered the preferred embodiments of the invention, it will be obvious to those skilled in the art that various changes and modifications can be made therein without departing from the scope of the invention defined by the appended claims.

I claim:

1. An apparatus for determining vertical displacement, comprising:

a support means;

a first adjustment means, said first adjustment means being connected to said support means, said first adjustment means being capable of being adjusted vertically relative to said support means;

a fluid reservoir, said fluid reservoir containing at least one fluid inlet and at least one fluid outlet, said fluid reservoir being connected to said first adjustment means, said fluid reservoir suspending freely from said support means; and a measuring instrument, said measuring instrument including a base portion having a bottom and upright tube defining a chamber for containing a fluid, said tube having a lower portion with a first access opening communicating with the fluid and an upper end portion defining an access opening to the atmosphere, said measuring instrument being in fluid communication with said fluid reservoir.

2. An apparatus in accordance with claim 1, further comprising a second adjustment means, said second adjustment means being capable of being adjusted lengthwise, said second adjustments means being connected to said first adjustment means, said second adjustment means being connected to said support means.

3. An apparatus in accordance with claim 1, further comprising a second access opening in the lower portion of said tube.

4. An apparatus in accordance with claim 1, wherein said first access opening includes an operator actuated first valve means for selectively sealing said first access opening in said lower portion of said tube.

5. An apparatus in accordance with claim 3, wherein said second access opening includes an operator actuated first valve means for selectively sealing said second access opening in said lower portion of said tube.

6. An apparatus in accordance with claim 1, wherein said first access opening includes an operator actuated second valve means mounted in the access opening of said upper end portion of said tube for selectively venting said chamber of said tube to the ambient atmosphere.

7. An apparatus in accordance with claim 1, wherein said fluid outlet includes an operator actuated valve means for selectively sealing said fluid outlet of said fluid reservoir.

8. An apparatus in accordance with claim 1, wherein said support means comprises a tripod.

9. An apparatus in accordance with claim 1, wherein said measuring instrument has indicia means for determining the level of liquid within said tube.

10. An apparatus in accordance with claim 9, wherein said indicia means are disposed on an outer surface of said measuring instrument.

11. An apparatus in accordance with claim 9, wherein said indicia means are disposed within said tube of said measuring instrument.

12. An apparatus for determining vertical displacement, comprising:

a support means;

a first adjustment means, said first adjustment means being connected to said support means, said first adjustment means being capable of being adjusted vertically relative to said support means;

a fluid reservoir, said fluid reservoir containing at least one fluid inlet and at least one fluid outlet, said fluid reservoir being connected to said first adjustment means, said fluid reservoir suspending freely from said support means; and a measuring instrument, said measuring instrument comprising a substantially rectangular member, said member having a top surface, a bottom surface, a first end, a second end, and a body, said top surface having a centrally located area defining a recess, said recess extending from substantially said first end to substantially said second end, said recess tightly receiving a tube defining a chamber for containing a fluid, said tube having a lower portion with a first access opening to the atmosphere, said measuring instrument being in fluid communication with said fluid reservoir.

13. An apparatus in accordance with claim 12, further comprising a second adjustment means, said second adjustment means being capable of being adjusted lengthwise, said second adjustments means being connected to said first adjustment means, said second adjustment means being connected to said support means.

14. An apparatus in accordance with claim 12, wherein said access opening includes an operator actuated second valve means mounted in the access opening of said upper end portion of said tube for selectively venting said chamber of said tube to the ambient atmosphere.

15. An apparatus in accordance with claim 12, wherein said fluid outlet includes an operator actuated valve means for selectively sealing said fluid outlet of said fluid reservoir.

16. An apparatus in accordance with claim 12, wherein said support means comprises a tripod.

17. An apparatus in accordance with claim 12, wherein said measuring instrument has indicia means for determining the level of liquid within said tube.

18. An apparatus in accordance with claim 12, wherein said member has a plurality of spirit vials disposed within said body.

19. An apparatus in accordance with claim 12, wherein said top surface of said member has indicia means for determining the level of liquid within said tube.

20. An apparatus in accordance with claim 12, wherein said member has a closed circuit vertical displacement measuring system disposed within said body, said closed circuit vertical displacement measuring system comprising first and second measuring instruments, said first and second measuring instruments being in fluid communication with each other, said first and second measuring instruments having indicia means for determining the level of liquid within said first and second measuring instruments.

21. An apparatus in accordance with claim 17, wherein said indicia means are disposed on an outer surface of said measuring instrument.

22. An apparatus in accordance with claim 17, wherein said indicia means are disposed within said tube of said measuring instrument.

* * * * *

UNITED STATES PATENT AND TRADEMARK OFFICE
CERTIFICATE OF CORRECTION

PATENT NO. : 5,937,529
DATED : August 17, 1999
INVENTOR(S) : Aubrey W. Brewer

It is certified that error appears in the above-identified patent and that said Letters Patent is hereby corrected as shown below:

Column 3, line 17, after "means", insert --,--.

Column 3, line 25, after "communication", insert --with--.

Column 6, line 23, after "11", insert --.--.

Column 6, line 37, after "receive", delete "a".

Column 6, line 54, after "tube", insert --13--.

Column 8, line 41, "an" should be --a--.

Column 8, line 48, delete "a".

Column 8, line 53, delete first "be".

Column 9, line 53, Claim 2, delete "lengthwise" and insert --vertically relative to said support means--.

Column 9, line 54, Claim 2, "adjustments" should be --adjustment--.

UNITED STATES PATENT AND TRADEMARK OFFICE
CERTIFICATE OF CORRECTION

PATENT NO. : 5,937,529
DATED : August 17, 1999
INVENTOR(S) : Aubrey W. Brewer

It is certified that error appears in the above-identified patent and that said Letters Patent is hereby corrected as shown below:

Column 10, line 48, Claim 13, delete "lengthwise" and insert --vertically relative to said support means--.

Column 10, line 49, Claim 13, "adjustments" should be --adjustment--.

Signed and Sealed this

Eighteenth Day of April, 2000

Attest:

Q. TODD DICKINSON

Attesting Officer    Director of Patents and Trademarks